Patented Sept. 20, 1949

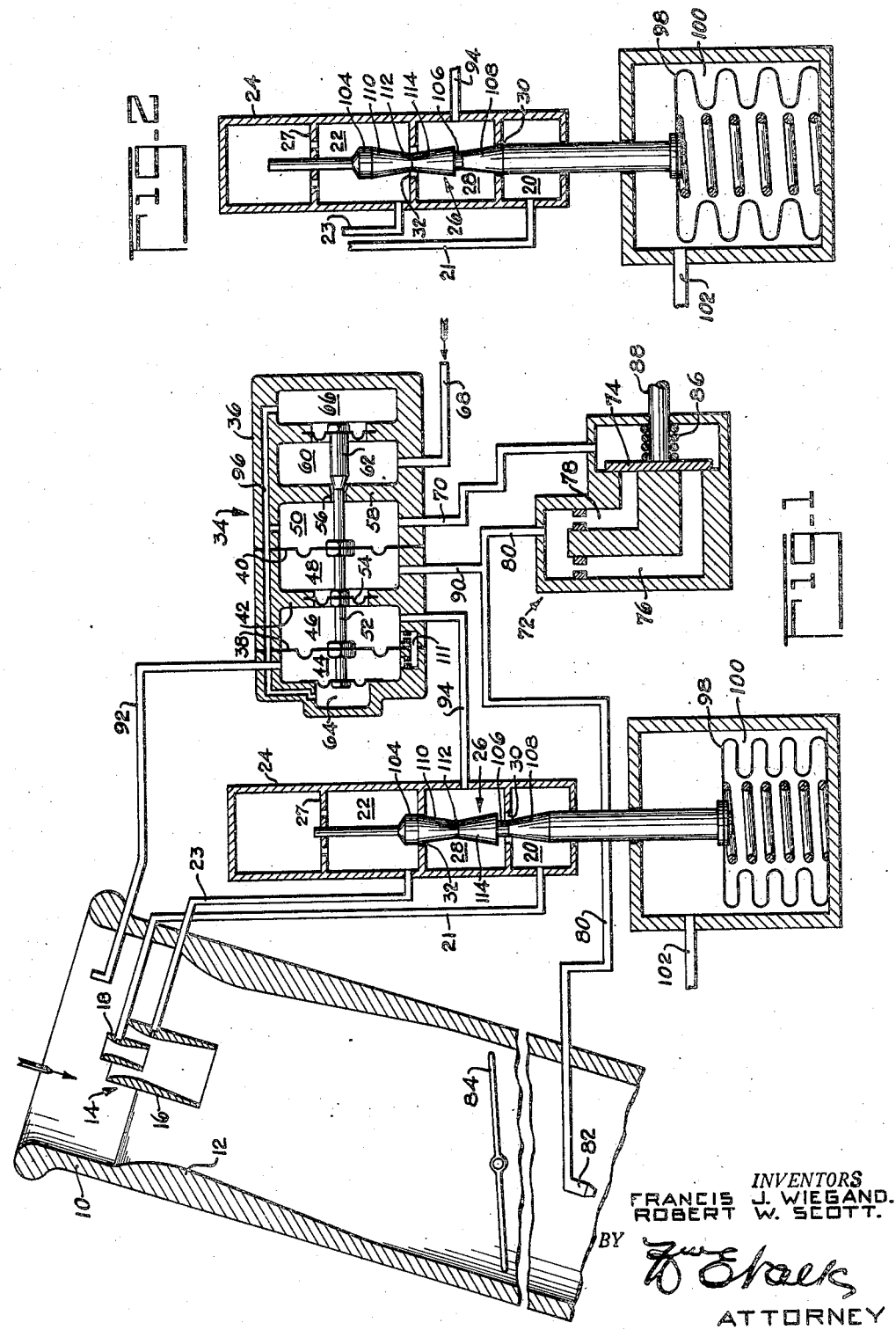

2,482,528

UNITED STATES PATENT OFFICE 2,482,528

DOUBLE-BOOST VENTURI CONSTRUCTION

Francis J. Wiegand, Ridgewood, and Robert W. Scott, Packanack Lake, N. J., assignors to Wright Aeronautical Corporation, a corporation of New York Application June 8, 1945, Serial No. 598,320

5 Claims. (Cl. 261—69)

This invention relates to Venturi measuring means and is particularly directed to a Venturi measuring system capable of providing an accurate measure of the mass rate of gas flow therethrough regardless of variations in density of the gas.

The pressure differential between the entrance and throat of a Venturi tube is a measure of the magnitude of the fluid flow through the Venturi tube. As herein after used, this pressure differential is termed the "suction pressure" of the Venturi tube. In the case of a gas, for a given mass flow rate through a Venturi tube, the Venturi suction pressure increases as the density of the gas decreases. By providing suitable automatically-adjustable bleeds, this suction pressure can be used for measuring the mass flow rate of the gas even though the density of the gas varies. For a given mass flow rate, a decrease in the gas density is accompanied by an increase in the gas velocity through the Venturi tube. If the gas density decreases beyond the point at which the flow through the Venturi tube approaches the velocity of sound, the Venturi tube no longer furnishes an accurate indication of the mass rate of gas flow therethrough.

This phenomenon is of particular importance in aircraft engines utilizing a Venturi tube at the air entrance to the engine induction system for measuring the air flow therethrough in order to control the fuel flow in proportion thereto. Thus, when a single Venturi tube is used on an aircraft engine for measuring the air flow, if the Venturi throat is made small enough to provide a sufficiently-large suction pressure at sea level, the Venturi tube may have a critical altitude of approximately 20,000 feet at a mass rate of air flow corresponding to the sea-level rated-power of the aircraft engine. That is, at a mass rate of air flow corresponding to the sea-level rated-power of the engine and as an altitude of approximately 20,000 feet is approached, the velocity of the air flow through the Venturi tube will approach the velocity of sound. However, at lower engine powers, the Venturi suction will continue to provide an accurate measure of the air flow at altitudes above 20,000 feet since the velocity of the flow through the Venturi tube will decrease with a decrease in the mass flow rate, that is with a decrease in engine power. If the single Venturi tube is made larger so that the velocity of air flow therethrough at the sea-level rated-power of the engine does not approach the velocity of sound until an altitude substantially in excess of 20,000 feet is reached, then the Venturi suction at sea level is too small to be useful for controlling the fuel flow.

Modern aircraft engines have been and are being designed to operate at altitudes as high as 40,000 feet at rated sea level power. Accordingly, it is an object of this invention to provide a Venturi air flow measuring system which is capable of providing an accurate measure of the mass rate of air flow from sea level to an altitude as high as at least 40,000 feet for the sea-level rated-power of the engine.

Specifically, the invention comprises a double Venturi system particularly useful for measuring the air flow into an aircraft engine, which system comprises two Venturi tubes of different size, the one being capable of providing an adequate suction pressure between sea level and an altitude of 20,000 feet and the other between altitudes of 20,000 feet and 40,000 feet. In addition, barometrically and thermostatically-controlled means are arranged to adjust the suction pressure made available by said two Venturi tubes such that the Venturi system is capable of providing an accurate measurement of the mass rate of air flow from sea level to an altitude of approximately 40,000 feet and at a mass air flow rate corresponding to the sea-level rated-power of the engine.

Other objects of this invention will become apparent upon reading the annexed detailed description in connection with the drawing in which:

Figure 1 is a diametric view of a fuel-air ratio portioning system embodying the invention; and Figure 2 is a view showing the position of the automatic valve of Figure 1 at a higher altitude.

Referring to the drawing, 10 designates the air intake conduit for the induction system of an aircraft engine having a main Venturi tube 12 disposed therein. A double boost Venturi assembly 14 is disposed within the throat of the main Venturi tube 12 and comprises a first boost Venturi tube 16 extending into and terminating substantially at the throat of the main Venturi tube 12 and a second boost Venturi tube 18 extending into and terminating substantially at the throat of the first boost Venturi tube 16. As used herein, a boost Venturi tube is a Venturi tube co-axial with and having its downstream end terminating within and substantially at the throat of another Venturi tube.

The throat or suction pressure of the first and second boost Venturi tubes are respectively transmitted to end chambers 20 and 22 in a valve housing 24 by conduits 21 and 23 respectively.

A compound valve 26, piloted within an end wall of the housing and in a guide portion 27 extending thereacross, controls the communication of an intermediate valve housing chamber 28 with the end chambers 20 and 22 through valve ports 30 and 32 respectively. The suction pressure in the intermediate chamber 28—that is, the pressure differential between the intermediate chamber 28 and the air entrance impact pressure to the Venturi system—is used to regulate the engine fuel flow in proportion to the air flow through the conduit 10 by means of a suitable pressure-balancing diaphragm system 34.

As illustrated, the diaphragm system 34 is disposed within a housing 36 having a pair of flexible diaphragms 38 and 40 and a fixed intermediate partition 42 extending thereacross to define chambers 44, 46, 48 and 50. The flexible diaphragms 38 and 40 are connected together for joint movement by a valve stem member 52 which extends through a fixed partition 42.

A small flexible diaphragm 54 provides a seal between this fixed partition and the valve stem member 52. The valve stem 52 extends through a valve port opening 56 in a second fixed partition 58 and into a chamber 60. The valve stem 52 is provided with a valve head 62 disposed within the chamber 60 for cooperation with the valve opening 56 to provide a fuel flow regulating valve. The valve stem 52 is also provided with small flexible diaphragms at its ends to provide sealed end chambers 64 and 66 therefor.

Fuel under pressure is admitted to the chamber 60 from a fuel supply line 68 and flows therethrough into the chamber 50 under the control of the fuel regulating valve 62 and thence through a conduit 70 into a mixture-control unit 72. The mixture-control unit 72 comprises a mixture-control disc 74 having a plurality of openings (not shown) adapted to selectively establish communication between the conduit 70 and any one of a plurality of restricted passages such as 76 and 78. From the passage 76 and/or passage 78, the fuel flows into a conduit 80 and is discharged therefrom into the air duct 10 through a suitable nozzle 82 disposed below a throttle valve 84 in the duct 10. A spring means 86 serves to urge the mixture-control disc against a flat face into which the various passages 76 and 78 open and a handle 88 is provided for rotatively adjusting the disc 74 for establishing communication between the fuel passage 70 and a selected restricted passage 76 and/or 78. The fuel conduit 80 is also connected into the chamber 48 by a conduit 90. The chambers 44 and 46 of the pressure-balancing system are respectively connected by conduits 92 and 94 with the air entrance opening of the Venturi system and with the intermediate valve housing chamber 28.

With this construtcion, the diaphragm 40 is subjected to a pressure differential in proportion to the fuel flow and, as will hereinafter appear, the diaphragm 38 is subjected to a pressure differential in proportion to the air flow. Accordingly, the fuel valve 62 is automatically adjusted by the differential pressure across the diaphragms 38 and 40 to vary the fuel flow in proportion to the air flow. The richness of the fuel-air mixture is determined by the setting of the mixture-control disc 74. Also, the chambers 64 and 66 at the ends of the valve stem are in communication with each other and with the chamber 50 by way of a passage 96. The purpose of this latter feature is to eliminate any pressure differential between the ends of the valve stem. At this point, it should be noted that the invention is not limited to the afore-described specific form of system 34 for controlling the fuel flow by a pressure differential proportional to the air flow.

The pressure within the intermediate valve housing chamber 28 is controlled by a compound valve 26 which is barometrically and thermostatically-controlled to compensate for variations in the air density.

To this end, the valve 26 is secured to a sealed partially-evacuated bellows 98 whereby changes in the pressure and temperature of the air surrounding the bellows is effective to axially adjust the valve. The bellows 98 is disposed within a chamber 100 subject to the temperature and pressure of air entering the duct 10. Thus a pipe 102 may place this chamber in communication with the static air pressure at the entrance to the duct 10. As a result, the valve 26 is automatically adjusted with variations in air density with altitude. Instead of connecting the bellows chamber 100 to the static air pressure at the entrance to the duct 10, it is within the scope of this invention to connect this chamber to any pressure source or sources variable with density of the fluid flow to be measured, as for exmple the impact pressure at the entrance to the duct 10 or some other pressure associated with the Venturi system. A compression spring 101 may be provided to help balance the pressure differential between the inside and outside of the bellows.

Since the bellows 98 is only partially evacuated, the bellows expands and contracts with increase and decrease of the surrounding air temperature. Accordingly, an increase in the surrounding air temperature produces movement of the valve 26 in the same direction as a decrease in the surrounding air pressure. In the following description, predetermined or so-called standard atmospheric temperature and pressure conditions are assumed.

The valve 26 is provided with a large diameter portion 104 which as illustrated in Figure 1 is adapted to close the port 32 between the valve housing chamber 22 and the intermediate chamber 28 at sea level. At the same time, a reduced diameter portion 106 on the valve is disposed in the port 30 at sea level, thereby providing free communication between the end chamber 20 and the intermediate chamber 28. Therefore, at sea level, the end chamber 22, which is in communication with the first boost Venturi tube 16 through conduit 23, is closed by the valve portion 104 while the end chamber 20 in communication with the second boost Venturi tube 18 through conduit 21 is open to the intermediate chamber 28. The pressure within this intermediate chamber 28 is transmitted to the balacing diaphragm system chamber 46 through the conduit 94. In this way, at sea level the diaphragm 38 is subjected to the suction pressure of the second boost Venturi tube 18.

As the altitude increases, the suction pressure of the second boost Venturi tube increases for a given mass rate of air flow. This suction pressure is corrected to its sea level value by providing a bleed between the two boost Venturi tubes. Thus, as the altitude increases, the bellows 98 expands and raises the valve 26 and, as a result, tapered valve portions 108 and 110 respectively enter the valve ports 30 and 32 to gradually close the port 30 and open the port 32. Therefore, air is bled or flows from the throat of the first boost Venturi tube 16 through the intermediate chamber 28 and the port 30 to the throat of the second boost Venturi tube 18 and also from the air impact pressure line through a restricted passage 111 around the diaphragm 38 to the chamber 28 and thence through the port 30 to the throat of the second Venturi tube 18, thereby throttling the suction pressure of the second Venturi tube 18 in the chamber 28. The tapered valve portions 108 and 110 are so contoured that the available suction pressure, or pressure differential between the pressure in chamber 28 and the pressure in conduit 92, is substantially equal to the suction pressure the second boost Venturi tube 18 would have at sea level for the same mass rate of air flow. At a predetermined altitude—for example, 20,000 feet—the valve portion 108 entirely closes the port 30 and a reduced diameter portion 112 provides a maximum opening at the port 32 as illustrated in Figure 2. At this predetermined altitude, the suction pressure of the second boost Venturi tube 18 is entirely closed to the intermediate chamber 28 and only the suction pressure of the first boost Venturi tube 16 is open to the intermediate chamber 28.

The first boost Venturi tube 16 is designed to have the same suction pressure at 20,000 feet as the second boost Venturi tube 18 has at sea level for the same mass rate of air flow. In addition, the first boost Venturi tube 16 is of such size that the velocity of flow therethrough does not approach the velocity of sound until an altitude of approximately 40,000 feet is reached for a mass air-flow rate corresponding to the sea-level rated-power of the engine. Above 20,000 feet, the valve 26 continues to rise, but the port 30 remains closed and another tapered portion 114 on the valve gradually throttles the port opening 32. There is a small flow of air from the impact pressure line 92 through the restricted passage 111 around the diaphragm 38 to the chamber 28, and thence through the port 32 to the throat of the first boost Venturi tube 16. Therefore, as the altitude increases above 20,000 feet, the valve portion 114 gradually throttles the suction pressure in the intermediate chamber 28 to compensate for the increasing suction pressure of the main boost Venturi 16 with altitude. That is, the valve portion 114 is so contoured that above 20,000 feet, the valve automatically corrects the suction pressure in the chamber 28 to the magnitude of suction pressure the first boost Venturi tube 16 would have at 20,000 feet for the same mass rate of air flow.

With this construction, between sea level and 20,000 feet, the air pressure differential made available for regulating the fuel flow is equal to the suction pressure the second boost Venturi tube 18 would have at sea level for the same mass rate of airflow. Between 20,000 and 40,000 feet, the air pressure differential made available for regulating the fuel flow is equal to the suction pressure the first boost Venturi tube 16 would have at 20,000 feet for the same mass rate of air flow, which value corresponds to the suction pressure of the second boost Venturi tube 18 at sea level for the same mass flow rate. Accordingly, the double boost Venturi system provides accurate suction pressure measurement of the mass rate of air flow into an engine at high or low altitudes and at high or low mass air flow rates.

At this point, it should be noted that the invention obviously is not limited to the aforementioned specific critical altitudes—namely, 20,000 and 40,000 feet for the two boost Venturi tubes. Also, the main Venturi tube 12 only increases the suction pressures made available by the boost Venturi tubes 16 and 18. Accordingly, if smaller suction pressures can be used to control the fuel valve 62, the main Venturi tube 12 could be dispensed with, in which case the Venturi tube 16 may be increased in diameter to that of the pipe 10 and the boost Venturi tube 18 correspondingly increased in diameter.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Mechanism for controlling the fuel-air ratio of the combustion mixture for an engine, said mechanism comprising a first Venturi tube in the air flow path, a second Venturi tube disposed as a boost Venturi tube in relation to said first Venturi tube, a chamber, means providing a first passage to establish communication between said chamber and the throat of said first Venturi tube, means providing a second passage to establish communication between said chamber and the throat of said second Venturi tube, means having a plurality of valve portions cooperable with and movable relative to both said passages so as to vary the extent to which both said passages are open or closed, barometric means for moving said valve portions so that at a low altitude said valve portions are effective to close said first passage and open said second passage and upon an increase in altitude to a predetermined value said valve portions are effective to close said second passage and open said first passage and upon further increases in altitude said valve portions maintain said second passage closed and effect closing adjustments of said first passage, and means responsive to changes in pressure in said chamber for regulating the fuel flow.

2. Mechanism for controlling the fuel-air ratio of the combustion mixture for an engine, said mechanism comprising a first Venturi tube in the air flow path, a second Venturi tube disposed as a boost Venturi tube in relation to said first Venturi tube, a chamber, means providing a second passage to establish communication between said chamber and the throat of said first Venturi tube, means providing a second passage to establish communication between said chamber and the throat of said second Venturi tube, means having a plurality of valve portions cooperable with and movable relative to both said passages so as to vary the extent to which both said passages are open or closed, barometric means for moving said valve portions so that at a low altitude said valve portions are effective to close said first passage and open said second passage and upon an increase in altitude to a predetermined value said valve portions are effective to close said second passage and open said first passage and upon further increases in altitude said valve portions maintain said second passage closed and effect closing adjustments of said first passage, means responsive to the pressure differential between a pressure in the air flow path and the pressure in said chamber for regulating the fuel flow, and a restricted by-pass passage for said pressure differential around said responsive means.

3. Mechanism for controlling the fuel-air ratio of the combustion mixture for an engine: said mechanism comprising means movable in response to changes in the fluid pressure acting thereon for controlling the fuel flow; a first Venturi tube in the air flow path; a second Venturi tube disposed as a boost Venturi tube in relation to said first Venturi tube; means providing a first passage to establish communication between throat of said first Venturi tube and said fluid pressure responsive means; means providing a second passage to establish communication between the throat of said second Venturi tube and said fluid pressure responsive means; means having a plurality of valve portions cooperable with and movable relative to both said passages for controlling the extent to which both said passages are open or closed and barometric means for controlling said valve portions so that at a low altitude said first passage is closed and said second passage is open, said valve portions also being arranged so that as said altitude increases, from said low altitude, said first and second passages are progressively opened and closed respectively and, as said altitude increases above a predetermined high value, said second passage remains closed and said first passage is progressively closed.

4. Mechanism for controlling the fuel-air ratio of the combustion mixture for an engine: said mechanism comprising a first Venturi tube in the air flow path; a second Venturi tube disposed as a boost Venturi tube in relation to said first Venturi tube; a chamber; means providing a first passage having one end adapted to communicate with said chamber and having its other end opening into the throat of said first Venturi tube; means providing a second passage having one end adapted to communicate with said chamber and having its other end opening into the throat of said second Venturi tube; a first valve movable to control said first passage; a second valve movable to control said second passage; barometric means for automatically controlling said first and second valves so that at a low altitude said first valve is at a minimum open position and said second valve is at a maximum open position and as said altitude increases to a predetermined value said first valve moves to its maximum open position and said second valve moves to its minimum open position and at still higher altitudes said second valve remains at a minimum open position and said first valve moves in a closing direction; and means responsive to changes in pressure in said chamber to regulate the fuel flow.

5. Mechanism for controlling the fuel-air ratio of the combustion mixture for an engine: said mechanism comprising a first Venturi tube in the air flow path; a second Venturi tube disposed as a boost Venturi tube in relation to said first Venturi tube; a chamber; means providing a first passage having one end adapted to communicate with said chamber and having its other end opening into the throat of said first Venturi tube; means providing a second passage having one end adapted to communicate with said chamber and having its other end opening into the throat of said second Venturi tube; a first valve movable to control said first passage; a second valve movable to control said second passage; barometric means for automatically controlling said first and second valves so that at a low altitude said first valve is at a minimum open position and said second valve is at a maximum open position and as said altitude increases to a predetermined value said first valve moves to its maximum open position and said second valve moves to its minimum open position and at still higher altitudes said second valve remains at a minimum open position and said first valve moves in a closing direction; means responsive to the pressure differential between air pressure in said flow path and the fluid pressure in said chamber for regulating the fuel flow; and means providing a restricted by-pass passage for said pressure differential around said responsive means.

FRANCIS J. WIEGAND.
ROBERT W. SCOTT.

REFERENCES CITED

The following references are of record in the file of this patent:

UNITED STATES PATENTS

| Number | Name | Date |
| --- | --- | --- |
| 2,216,677 | Schuttler | Oct. 1, 1940 |
| 2,361,227 | Mock | Oct. 24, 1944 |
| 2,391,755 | Twyman | Dec. 25, 1945 |
| 2,396,031 | Udale et al. | Mar. 5, 1946 |
| 2,399,079 | Udale | Apr. 23, 1946 |
| 2,411,287 | Mock | Nov. 19, 1946 |

FOREIGN PATENTS

| Number | Country | Date |
| --- | --- | --- |
| 135,557 | Great Britain | Dec. 4, 1919 |
| 561,017 | Great Britain | May 2, 1944 |